United States Patent
Kolpasky et al.

(10) Patent No.: US 7,474,309 B2
(45) Date of Patent: Jan. 6, 2009

(54) HYBRID VEHICLE DISPLAY APPARATUS AND METHOD

(75) Inventors: Kevin G. Kolpasky, Sterling Heights, MI (US); Mohsen D. Shabana, Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 869 days.

(21) Appl. No.: 10/737,509

(22) Filed: Dec. 16, 2003

(65) Prior Publication Data

US 2005/0128065 A1    Jun. 16, 2005

(51) Int. Cl.
G06T 11/20    (2006.01)
G09G 5/00    (2006.01)
G06F 3/048    (2006.01)
B60Q 1/00    (2006.01)

(52) U.S. Cl. .................... 345/440; 345/619; 715/772; 715/838; 340/441; 340/455; 340/462

(58) Field of Classification Search ............... 345/440, 345/619, 660, 661, 665, 666, 473, 474, 977, 345/418; 340/46.1, 425.5, 636.1, 441, 438, 340/455, 462, 815.4; 320/132, 104, 137, 320/127; 180/65.2; 429/13, 24; 715/764, 715/772, 700, 810, 815, 838, 839, 864; 290/40 C
See application file for complete search history.

(56) References Cited

U.S. PATENT DOCUMENTS

| | | | |
|---|---|---|---|
| 5,798,702 A * | 8/1998 | Okamoto et al. | 340/636.1 |
| 6,404,332 B1 | 6/2002 | Wakashiro et al. | 340/456 |
| 6,480,106 B1 * | 11/2002 | Crombez et al. | 340/461 |
| 6,581,707 B2 | 6/2003 | Morimoto et al. | 180/65.3 |
| 6,672,415 B1 * | 1/2004 | Tabata | 180/65.2 |
| 6,794,853 B2 * | 9/2004 | Kondo | 320/132 |
| 6,847,127 B1 * | 1/2005 | Lee | 290/40 C |
| 2002/0135711 A1 | 9/2002 | Mori | 349/58 |
| 2002/0171541 A1 | 11/2002 | Crombez | 340/461 |
| 2003/0006914 A1 | 1/2003 | Todoriki | 340/995 |
| 2004/0214054 A1 * | 10/2004 | Shige et al. | 429/13 |
| 2005/0181246 A1 * | 8/2005 | Nakaji | 429/13 |
| 2005/0278079 A1 * | 12/2005 | Maguire | 340/425.5 |
| 2007/0031709 A1 * | 2/2007 | Hosoe | 429/24 |

FOREIGN PATENT DOCUMENTS

| | | |
|---|---|---|
| JP | 07315078 | 12/1995 |
| JP | 09107601 | 4/1997 |
| JP | 2000247164 | 9/2000 |

* cited by examiner

Primary Examiner—Chante Harrison

(57) ABSTRACT

A display apparatus for a hybrid drive vehicle includes a screen that depicts a first icon, a second icon, and a third icon to represent energy sources and energy destinations. The appearance of the screen is variable to indicate the flow of energy between energy sources and energy destinations. In a preferred embodiment, changes in color, changes in icon size, and movement of elements are used to indicate energy flow.

20 Claims, 4 Drawing Sheets

HYBRID VEHICLE DISPLAY APPARATUS AND METHOD

TECHNICAL FIELD

This invention relates to display apparatuses for hybrid vehicles having first and second sources of energy to selectively power the vehicle, the display apparatuses including a display screen that is responsive to the first and second sources of energy transmitting energy to propel the vehicle.

BACKGROUND OF THE INVENTION

Hybrid drive vehicles are powered by two or more energy sources. Typical hybrid drive vehicles include a heat engine and a battery connected to a motor/generator as energy sources. Other hybrid drive vehicles may, for example, employ a fuel cell in hybrid combination with a battery.

An engine or fuel cell in a vehicle without hybrid drive acts as the sole source of energy to propel the vehicle. Accordingly, the behavior of the engine or fuel cell is directly related to the power applied to the vehicle's drive wheels to accelerate or maintain a given speed. A driver associates changes in engine sounds or fuel cell compressor sounds with changes in power delivered to the drive wheels for acceleration, climbing a hill, etc.

The flow of energy between vehicle components in a hybrid drive vehicle may be confusing to a driver because, in a hybrid drive vehicle, the behavior of the energy sources may not directly correspond with vehicle acceleration or speed. For example, when an engine or fuel cell is transmitting energy to charge a battery, a driver may be confused by changes in engine or fuel cell compressor sounds without a corresponding change in acceleration or power necessary to maintain speed.

SUMMARY OF THE INVENTION

A display apparatus for a hybrid drive vehicle is provided. The vehicle includes a first energy source that selectively transmits energy to propel the vehicle. The vehicle also includes a second energy source that selectively transmits energy to propel the vehicle. The second energy source also selectively transmits energy to the first energy source, which stores the energy from the second energy source for subsequent transmission to propel the vehicle.

The display apparatus includes a screen that is configured to display three icons spaced apart from one another. A first icon represents the first energy source, a second icon represents the second energy source, and a third icon represents vehicle propulsion. The display apparatus is connectable to the hybrid drive vehicle such that the appearance of the screen is responsive to, and thus indicative of, the transmission of energy from the first and second energy sources to propel the vehicle, and from the second energy source to the first energy source.

The display apparatus preferably employs various techniques to present information about energy flow within the vehicle that the driver can intuitively comprehend. First, the display apparatus preferably uses color to convey information. In an exemplary embodiment, a first portion of the screen between the first icon and the third icon displays a first color in response to the first energy source transmitting energy to propel the vehicle at a rate higher than a first predetermined rate. The first portion of the screen does not display the first color when the first energy source transmits energy to propel the vehicle at or below the first predetermined rate.

A second portion of the screen between the second icon and the third icon displays a second color different from the first color in response to the second energy source transmitting energy to propel the vehicle at a rate higher than a second predetermined rate. The second portion of the screen does not display the second color when the second energy source transmits energy to propel the vehicle at or below the second predetermined rate.

Preferably, at least a portion of the first icon is the first color, at least a portion of the second icon is the second color, no part of the first icon is the second color, and no part of the second icon is the first color. Thus, a driver associates the first color with the first icon and the first energy source, and the second color with the second icon and the second energy source. A driver may thus intuitively comprehend which of the energy sources is powering the vehicle based on the colors displayed on the screen.

Similarly, in the exemplary embodiment, at least part of the third icon is the first color in response to the first energy source transmitting energy to propel the vehicle above the first predetermined rate, and at least part of the third icon is the second color in response to the second energy source transmitting energy to propel the vehicle above the second predetermined rate.

Second, the display apparatus preferably uses movement to convey information about energy flow within the vehicle that the driver can intuitively comprehend. Color changes on the screen preferably generate visual elements that are animated to indicate energy flow. Accordingly, in the exemplary embodiment, at least one visual element is animated to move away from the first icon and toward the third icon in response to the first energy source transmitting energy above the first predetermined rate. Similarly, at least one visual element is animated to move away from the second icon and toward the third icon in response to the second energy source transmitting energy above the second predetermined rate.

Third, the display apparatus preferably employs size changes to convey information that the driver can intuitively comprehend about energy flow within the vehicle. The first icon is a first size in response to the first energy source transmitting energy to propel the vehicle at or below the first predetermined rate, and the first icon is a second size larger than the first size in response to the first energy source transmitting energy to propel the vehicle above the first predetermined rate. Similarly, the second icon is a third size in response to the second energy source transmitting energy to propel the vehicle at or below the second predetermined rate, and is a fourth size larger than the third size in response to the second energy source transmitting energy to propel the vehicle above the second predetermined rate. The third size may or may not be the same as the first size, and the fourth size may or may not be the same as the second size.

A corresponding method is also provided. The method includes altering the appearance of a screen to indicate, and in response to, the transmission of energy from the first energy source to propel the vehicle, the transmission of energy from the second energy source to propel the vehicle, and the transmission of energy from the second energy source to the first energy source.

The above objects, features and advantages, and other objects, features and advantages of the present invention are readily apparent from the following detailed description of the best mode for carrying out the invention when taken in connection with the accompanying drawings.

DESCRIPTION OF THE PREFERRED EMBODIMENT

Figure 1:
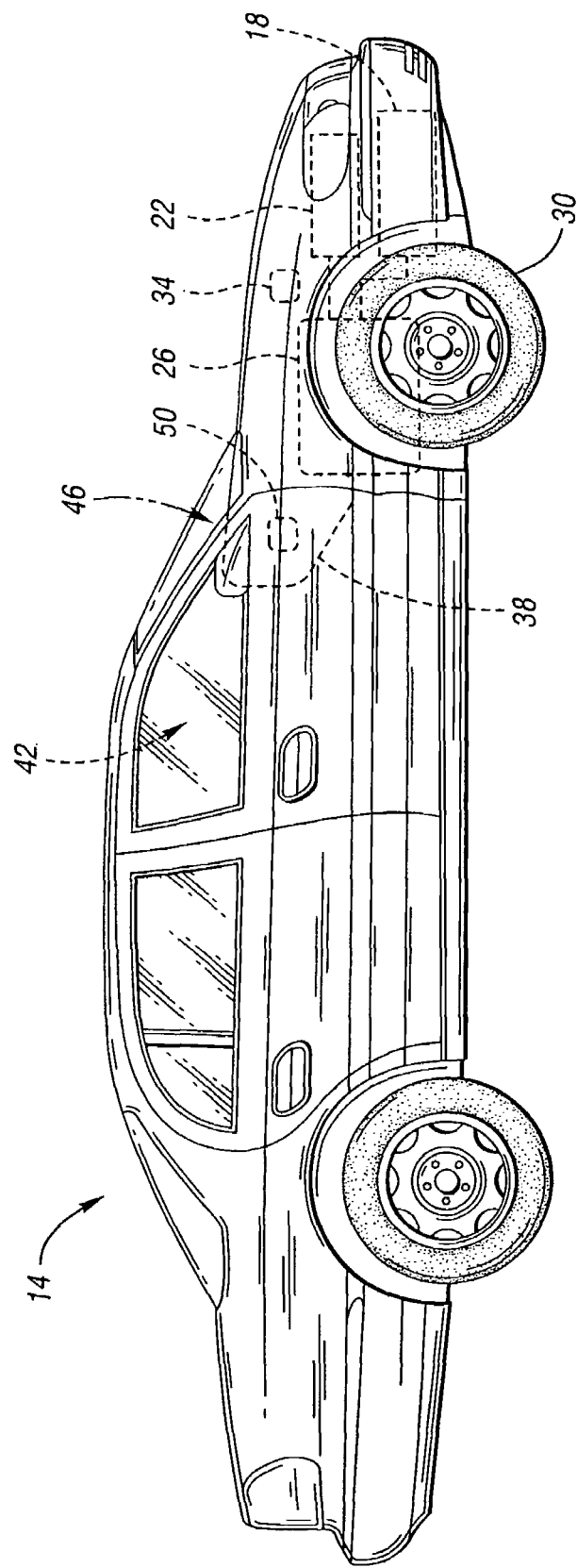
FIG. 1 is a schematic side view of a hybrid drive vehicle having a motor/generator, a fuel cell, and a battery.

Referring to FIG. 1, a hybrid drive vehicle 14 includes two electrical energy sources, namely a fuel cell 18 and a battery 22. In the context of the present invention, a "fuel cell" may or may not be a plurality of fuel cells in electrical communication with one another, such as in parallel or series combination. Similarly, a "battery" may or may not be a plurality of batteries in electrical communication with one another. Those skilled in the art will recognize other energy sources that may be employed in a hybrid drive within the scope of the claimed invention, such as engines, flywheels, hydraulic power assist systems, ultracapacitors, etc.

The vehicle 14 also includes an electric motor/generator (M/G) 26 that converts electrical energy to rotational mechanical energy to turn at least one drive wheel 30 and thereby propel the vehicle 14. The fuel cell 18 and the battery 22 are operatively connected to the M/G 26 and configured to selectively transmit electrical energy to the M/G. Within the scope of the claimed invention, more than one M/G may be employed to propel the vehicle. The battery is rechargeable by the fuel cell, which selectively transmits energy to the battery, and by the M/G, which transmits electrical energy to the battery during regenerative braking.

The respective rates at which the fuel cell 18 and the battery 22 transmit energy to the M/G to propel the vehicle are determined by a powertrain controller 34. The controller determines the respective rates of energy transmission based on various factors such as the charge level of the battery, the amount of hydrogen fuel available to the fuel cell, the amount of power required by the M/G based on driver demand, the response time of the fuel cell, and the maximum power outputs of the fuel cell and the battery.

An instrument panel 38 in a passenger compartment 42 informs a vehicle driver of various states and conditions of the vehicle and its components. A display apparatus 46 in the instrument panel 38 informs the vehicle driver of the flow of energy between the fuel cell, battery, and M/G. The display apparatus includes a controller 50 that receives signals indicative of the flow of energy between the fuel cell, battery, and M/G. The controller 50 is configured and programmed to process the signals and control an LCD screen (shown at 54 in FIG. 2) on the instrument panel in accordance with a predetermined algorithm.

Figure 2:
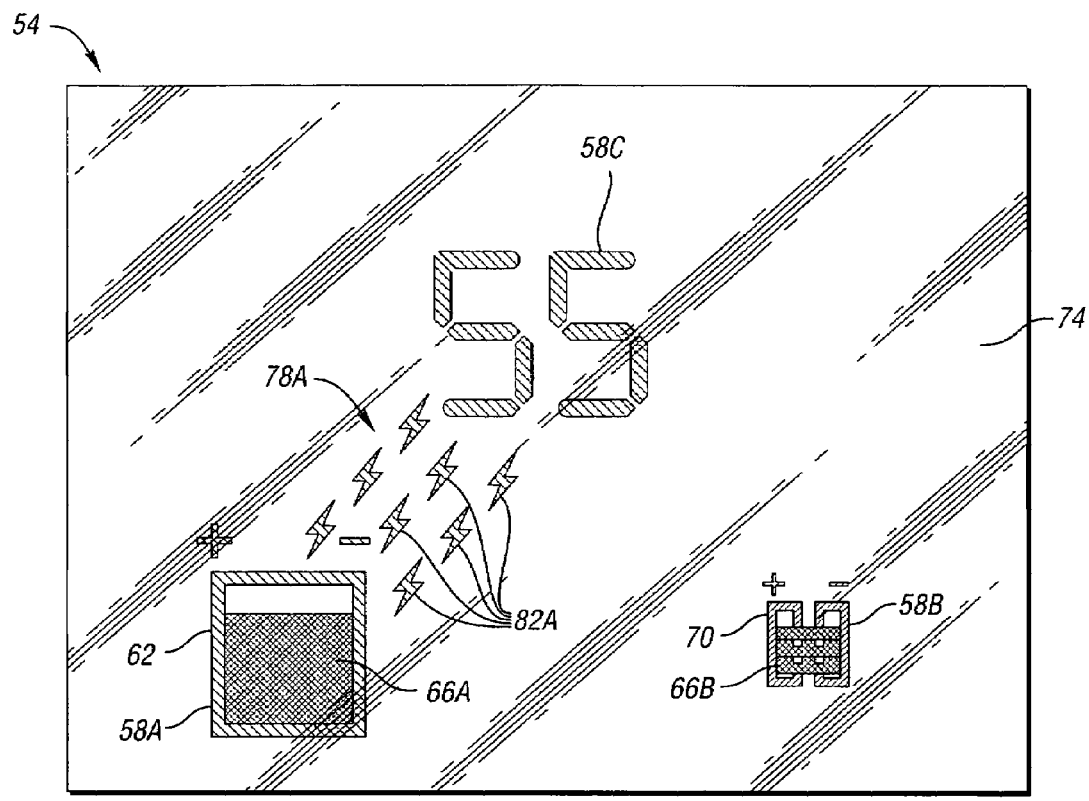
FIG. 2 is a schematic front view of a display screen in the vehicle of FIG. 1 indicating an operating condition in which the battery is transmitting energy to the motor/generator and the fuel cell is not transmitting energy to the motor/generator.

Referring to FIG. 2, the LCD screen 54 displays three icons. In the embodiment depicted, a first icon 58A is suggestive of a battery, a second icon 58B is suggestive of a fuel cell, and a third icon 58C indicates the vehicle speed in numeric characters. However, the icons may take a variety of forms within the scope of the claimed invention. For example, the third icon, which represents vehicle propulsion, may be suggestive of the body of the vehicle or an M/G.

At least a portion 62 of the first icon 58A is, i.e., displays, blue in color. To avoid the need for color drawings, the different colors are schematically represented by different cross-hatching patterns in the Figures. A gauge portion 66A of the first icon 58A is green in color and is selectively variable in size relative to the blue portion 62 to indicate battery charge. More specifically, the height of the gauge portion 66A relative to the blue portion 62 is proportional to the battery charge.

At least a portion 70 of the second icon 58B is red in color. A gauge portion 66B of the second icon 58B is green in color and is variable in size relative to the red portion 70 to indicate the amount of hydrogen fuel for the fuel cell stored in hydrogen fuel tanks (not shown). More specifically, the height of the gauge portion 66B relative to the red portion 70 is proportional to the amount of hydrogen fuel stored in the fuel tanks.

The first icon 58A displays a color, i.e., blue, that the second icon 58B does not display. Similarly, the second icon 58B displays a color, i.e., red, that the first icon 58A does not display. A vehicle user thus associates blue with the first icon and the battery, and red with the second icon and the fuel cell. The screen 54 preferably displays a uniform background color 74, such as white, black, gray, etc.

The appearance of the screen 54 is variable in response to energy flow between the fuel cell, M/G, and battery. More specifically, portions of the screen change color to indicate that the battery, the fuel cell, or the M/G is transmitting energy above respective predetermined rates and to indicate the destination or the use of the transmitted energy.

In FIG. 2, the third icon 58C is blue, the same color as the portion 62 of the first icon 58A, in response to, and to indicate that, the battery is transmitting energy to the M/G above a first predetermined rate. Portions of the screen 54 between the first icon 58A and the third icon 58C have changed from the background color to blue in order to form a set 78A of blue visual elements 82A that further indicate the transmission of energy from the battery to the M/G above the first predetermined rate. The set 78A of visual elements 82A extends from a point near the first icon to a point near the third icon. The visual elements 82A are preferably animated such that they appear to be moving away from the first icon 58A and toward the third icon 58C. The speed at which the visual elements 82A appear to be moving may or may not be proportional to the rate of energy transmission from the battery to the M/G. Alternatively, and within the scope of the claimed invention, the quantity of visual elements 82A displayed may or may not be proportional to the rate of energy transmission from the battery to the M/G.

In the context of the present invention, a "visual element" is formed by a portion of the display screen that has a different color from adjacent portions of the display screen. A visual element is therefore distinguishable from display portions adjacent to the visual element. In the context of the present invention, color includes hue, saturation, or brightness. Thus, a change in color includes a change in hue, saturation, or brightness.

The display apparatus is configured so that the first and second icons 58A, 58B are depictable in respective small and enlarged sizes. In FIG. 2, the first icon 58A is depicted in its respective enlarged size to further indicate that the battery is transmitting energy to the M/G above the first predetermined rate.

The fuel cell is not transmitting energy to the M/G above a second predetermined rate. Accordingly, no part of the third icon 58C is red, and the second icon 58B is depicted in its respective small size.

Figure 3:
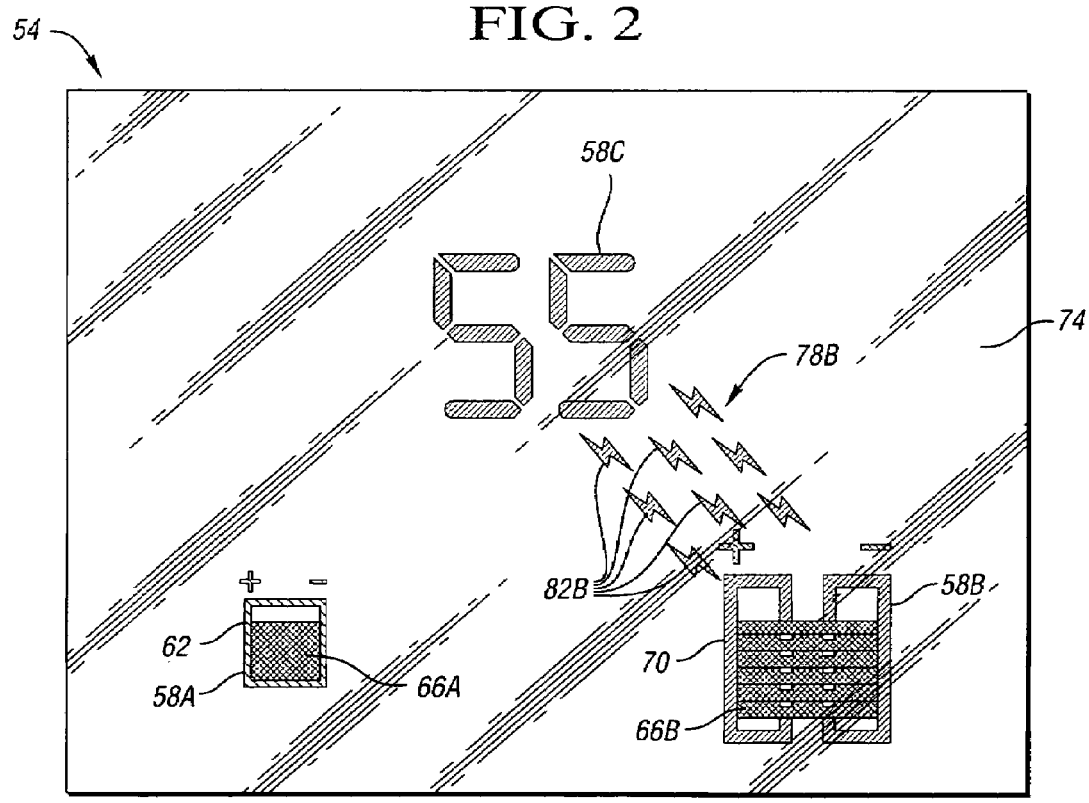
FIG. 3 is a schematic front view of the display screen of FIG. 2 indicating an operating condition in which the fuel cell is transmitting energy to the motor/generator, and the battery is not transmitting energy to the motor/generator.

Referring to FIG. 3, wherein like reference numbers refer to like components from FIG. 2, the battery is transmitting energy to the M/G at or below the first predetermined rate. In response, the first icon 58A is depicted in its respective small size, the set of blue visual elements is not displayed, and no part of the third icon 58C is blue.

The fuel cell is transmitting energy to the M/G at a rate higher than a second predetermined amount. Accordingly, the second icon 58B is displayed in its respective enlarged size, and the third icon 58C is red, the same color as portion 70 of the second icon 58B. Furthermore, portions of the screen 54 between the second icon 58B and the third icon 58C have changed from the background color to red thereby to form a set 78B of red visual elements 82B. The set 78B of visual elements 82B extends from a point near the second icon to a point near the third icon. The visual elements 82B are preferably animated to simulate movement of the elements 82B away from the second icon 58B and toward the third icon 58C. The speed at which the visual elements 82B appear to be moving may or may not be proportional to the rate of energy transmission from the battery to the M/G. Alternatively, and within the scope of the claimed invention, the quantity of visual elements 82B displayed may or may not be proportional to the rate of energy transmission from the fuel cell to the M/G.

Figure 4:
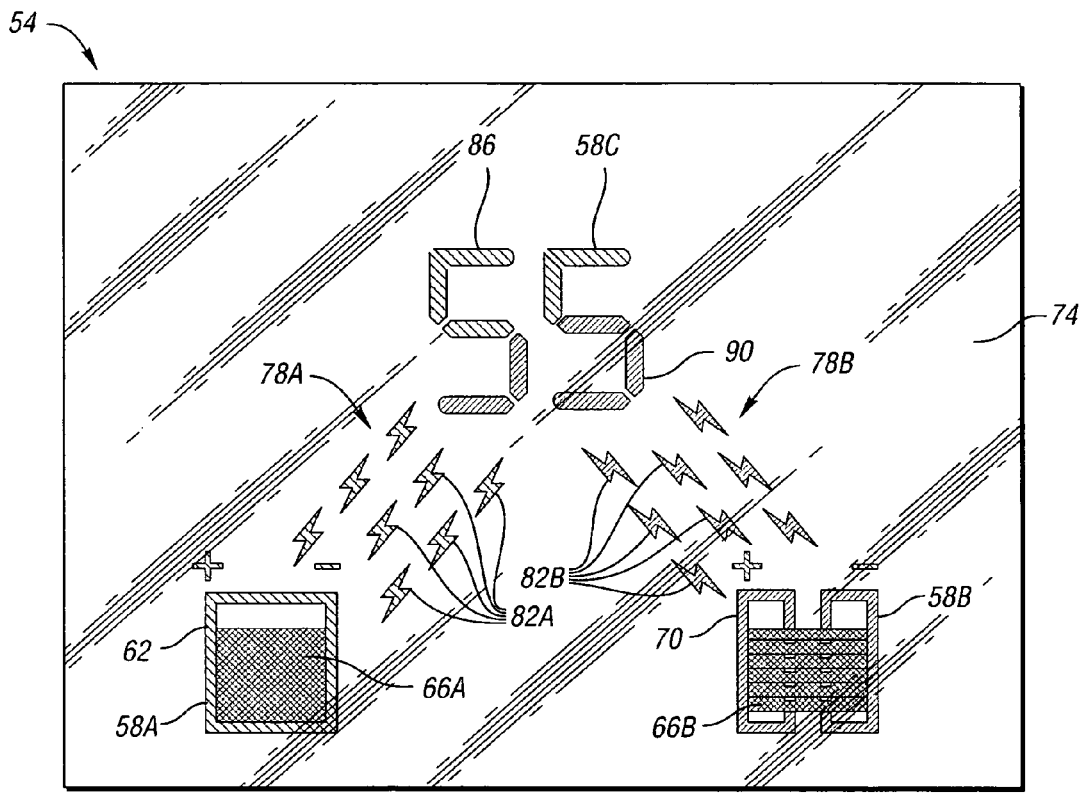
FIG. 4 is a schematic front view of the display screen of FIGS. 1-3 indicating an operating condition in which the fuel cell and the battery are transmitting energy to the motor/generator.

Referring to FIG. 4, wherein like reference numbers refer to like components from FIGS. 2-3, the battery and the fuel cell are transmitting energy to the M/G above the first and second predetermined rates, respectively. In response, a portion 86 of the third icon 58C is blue, and another portion 90 of the third icon 58C is red. Portions of the screen between the first icon and the third icon have changed from the background color to blue to form the set 78A of animated, blue visual elements 82A. Portions of the screen between the second icon and the third icon have changed from the background color to red to form the set 78B of animated, red visual elements 82B. The first and the second icons are depicted in their respective enlarged sizes.

Figure 5:
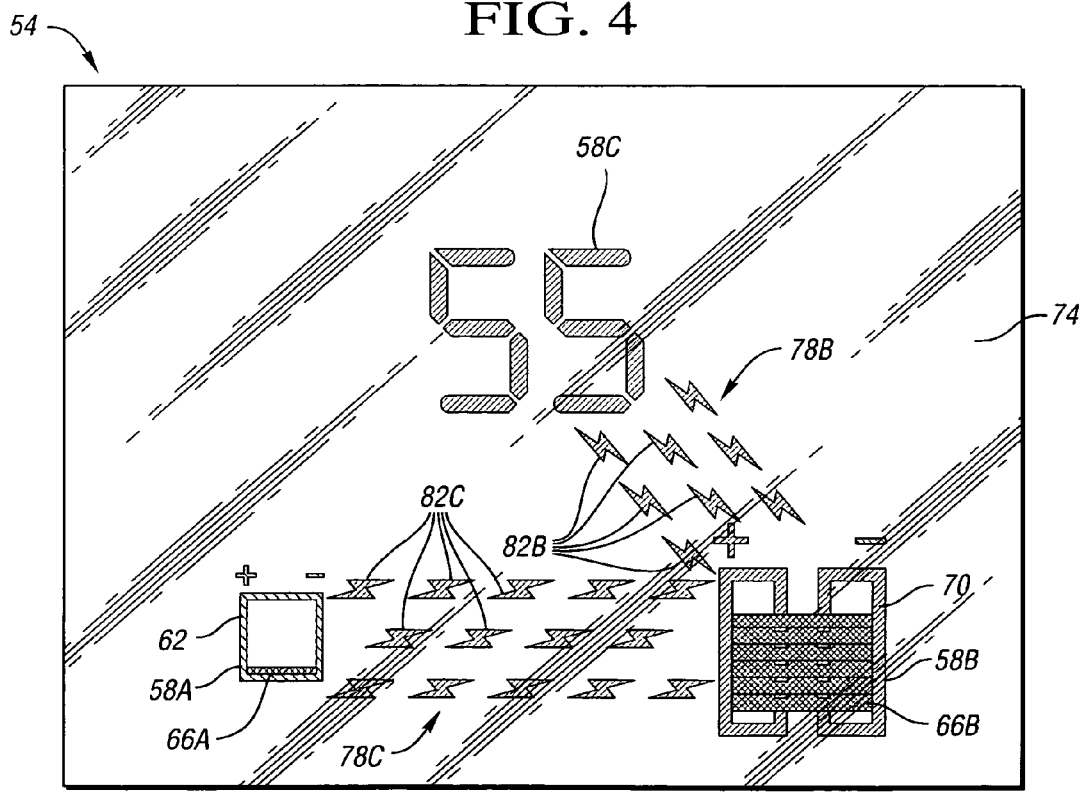
FIG. 5 is a schematic front view of the display screen of FIGS. 1-4 indicating an operating condition in which the fuel cell is transmitting energy to the battery and the motor/generator, and the battery is not transmitting energy to the motor/generator.

Referring to FIG. 5, wherein like reference numbers refer to like components from FIGS. 2-4, the battery charge is minimal, as indicated by the low height of the gauge portion 66A of the first icon 58A. The fuel cell is transmitting energy above a third predetermined rate to charge the battery and thereby store the energy. In response, portions of the screen between the second icon 58B and the first icon 58A have changed from the background color to red in order to form another set 78C of red visual elements 82C. The set 78C extends from a point near the second icon to a point near the first icon. The visual elements 82C are preferably animated to simulate movement of the elements away from the second icon and toward the first icon. The fuel cell is also transmitting energy to propel the vehicle above the second predetermined rate, and the battery is not transmitting energy above the first predetermined rate. Within the scope of the claimed invention, the first, second, and third predetermined rates may or may not be identical. In the preferred embodiment, the first, second, and third predetermined rates of energy transmission are zero watts.

Figure 6:
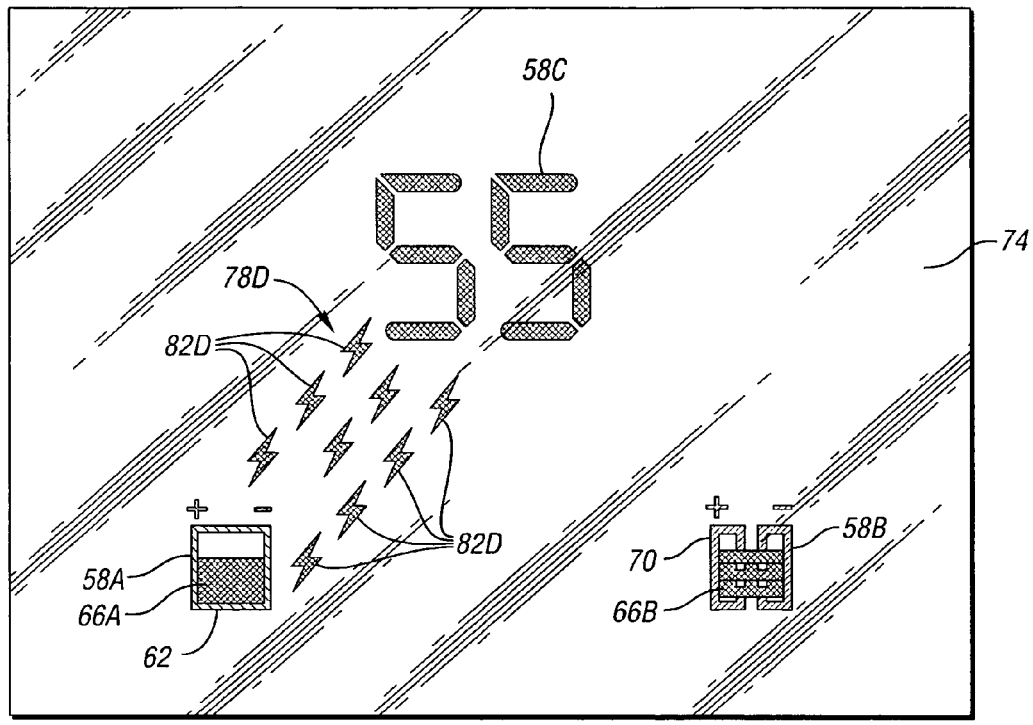
FIG. 6 is a schematic front view of the display screen of FIGS. 1-5 indicating an operating condition in which the motor/generator transmits energy to the battery during regenerative braking.

Referring again to FIG. 1, the vehicle 14 is preferably configured for regenerative braking such that the kinetic energy of the vehicle is converted by the M/G 26 to electrical energy during braking; the M/G 26 transmits the electrical energy to the battery 22 for recharging, i.e., storage. Referring to FIG. 6, wherein like reference numbers refer to like components from FIGS. 2-5, the third icon 58C displays green in response to, and to indicate that, the M/G is transmitting energy to the battery. To further indicate that the M/G is transmitting energy to the battery, portions of the screen between the first icon 58A and the third icon 58C have changed from the background color to green to form a set 78D of green visual elements 82D. The visual elements 82D are preferably animated such that they appear to be moving away from the third icon 58C and toward the first icon 58A.

Figure 7:
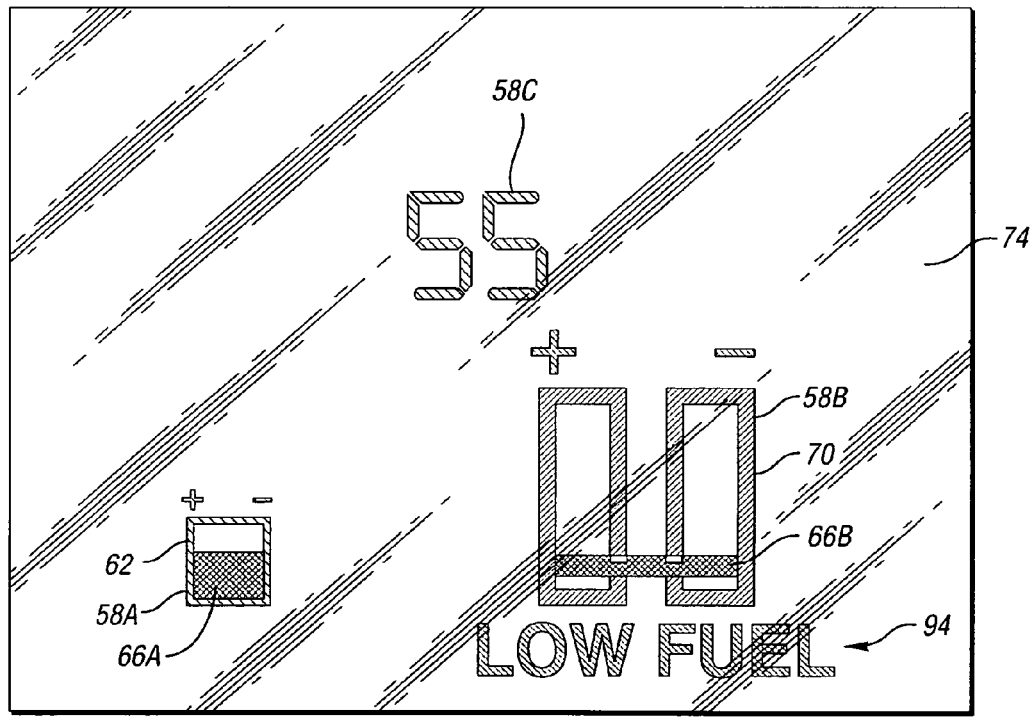
FIG. 7 is a schematic front view of the display screen of FIGS. 1-6 indicating an operating condition in which stored hydrogen for the fuel cell is below a predetermined amount.

Referring to FIG. 7, wherein like reference numbers refer to like components from FIGS. 2-6, the hydrogen storage tanks contain less than a predetermined amount of hydrogen fuel. The second icon 58B is depicted at a greatly enlarged size. Text 94 is displayed to further indicate that the storage tanks contain less than the predetermined amount of hydrogen.

While the best mode for carrying out the invention has been described in detail, those familiar with the art to which this invention relates will recognize various alternative designs and embodiments for practicing the invention within the scope of the appended claims.

The invention claimed is:

1. A display apparatus for a hybrid drive vehicle having a first energy source and a second energy source configured to selectively transmit energy to a motor/generator to propel the vehicle, the second energy source being configured to selectively transmit energy to the first energy source for storage, the display apparatus comprising:

a screen configured to display a first icon representing the first energy source, a second icon representing the second energy source, and a third icon representing propulsion of the vehicle, wherein the first, second and third icons are spaced apart from one another;

wherein the display apparatus is operatively connectable to the vehicle such that the appearance of the screen is responsive to (a) the transmission of energy from the first energy source to propel the vehicle, (b) the transmission of energy from the second energy source to propel the vehicle, and (c) the transmission of energy from the second energy source to the first energy source without the transmission of energy from the second energy source to the first energy source being via the motor/generator.

2. The display apparatus of claim 1, wherein the display apparatus is sufficiently configured such that a first portion of the screen displays a first color in response to the first energy source transmitting energy to propel the vehicle at a rate higher than a first predetermined rate;

the first portion of the screen does not display the first color in response to the first energy source transmitting energy to propel the vehicle at or below the first predetermined rate;

a second portion of the screen displays a second color in response to the second energy source transmitting energy to propel the vehicle at a rate higher than a second predetermined rate; and the second portion of the screen does not display the second color in response to the second energy source transmitting energy to propel the vehicle at or below the second predetermined rate.

3. The display apparatus of claim 2, wherein the first color is different from the second color, and wherein at least a portion of the first icon is the first color, and wherein at least a portion of the second icon is the second color.

4. The display of claim 3, wherein the first portion is between the first icon and the third icon, and the second portion is between the second icon and the third icon.

5. The display apparatus of claim 2, wherein the vehicle is configured for regenerative braking whereby the kinetic energy of the vehicle is converted and transmitted to the first energy source for storage; wherein the display apparatus is sufficiently configured such that a third portion of the screen displays a third color in response to energy from regenerative braking being transmitted to the first energy source above a third predetermined rate; and wherein the third portion does not display the third color in response to energy from regenerative braking being transmitted to the first energy source at or below the third predetermined rate.

6. The display apparatus of claim 5, wherein the third portion is between the third icon and the first icon.

7. The display apparatus of claim 5, wherein the third color is different from the first color and the second color.

8. The display apparatus of claim 5, wherein the third portion is at least partially coextensive with the third icon.

9. The display apparatus of claim 2, wherein a third portion of the screen displays a third color in response to the second energy source transmitting energy to the first energy source above a third predetermined rate; and wherein the third portion does not display the third color in response to the second energy source transmitting energy to the first energy source at or below the third predetermined rate.

10. The display apparatus of claim 9, wherein the third color is the same as the second color, and wherein the third portion is between the second icon and the first icon.

11. The display apparatus of claim 2, wherein the first portion is at least partially coextensive with the third icon, and wherein the second portion is at least partially coextensive with the third icon.

12. The display apparatus of claim 1, wherein the display apparatus is sufficiently configured such that the first icon is a first size in response to the first electrical energy source transmitting energy at or below a first predetermined rate to propel the vehicle, and a second size different from the first size in response to the first electrical energy source transmitting energy above the first predetermined rate to propel the vehicle; and wherein the second icon is a third size in response to the second electrical energy source transmitting energy at or below a second predetermined rate to propel the vehicle, and a fourth size different from the third size in response to the second electrical energy source transmitting energy above the second predetermined rate to propel the vehicle.

13. The display apparatus of claim 1, wherein the display apparatus is sufficiently configured such that the screen displays a first set of at least one visual element animated to simulate movement away from the first icon and toward the third icon in response to the first energy source transmitting energy to propel the vehicle above a first predetermined rate, a second set of at least one visual element animated to simulate movement away from the second icon toward the third icon in response to the second energy source transmitting energy to propel the vehicle above a second predetermined rate, and a third set of at least one visual element animated to simulate movement away from the second icon toward the first icon in response to the second energy source transmitting energy to the first energy source above a third predetermined rate.

14. A method of indicating the flow of energy among components in a hybrid drive vehicle having a first energy source and a second energy source configured to selectively transmit energy to a motor/generator to propel the vehicle, the second source being configured to selectively transmit energy to the first energy source for storage, the method comprising:

changing the appearance of a display screen in response to (a) the transmission of energy from the first energy source to propel the vehicle, (b) the transmission of energy from the second energy source to propel the vehicle, and (c) the transmission of energy from the second energy source to the first energy source without the transmitted energy being via the motor/generator; wherein the display depicts a first icon representing the first energy source, a second icon representing the second energy source, and a third icon representing propulsion of the vehicle.

15. The method of claim 14, wherein said changing the appearance of the display includes causing a first portion of the screen to display a first color in response to the first energy source transmitting energy to propel the vehicle at a rate higher than a first predetermined rate;

causing the first portion of the screen not to display the first color in response to the first energy source transmitting energy to propel the vehicle at or below the first predetermined rate;

causing a second portion of the screen to display a second color in response to the second energy source transmitting energy to propel the vehicle at a rate higher than a second predetermined rate; and causing the second portion of the screen not to display the second color in response to the second energy source transmitting energy to propel the vehicle at or below the second predetermined rate.

16. The method of claim 15, wherein said changing the appearance of the display further includes causing a third portion of the screen to display a third color in response to the second energy source transmitting energy to the first energy source above a third predetermined rate; and causing the third portion of the screen not to display the third color in response to the second energy source transmitting energy to the first energy source at or below the third predetermined rate.

17. The method of claim 15, wherein the first portion and the second portion are at least partially coextensive with the third icon.

18. The method of claim 14, wherein said changing the appearance of the screen includes causing the screen to display the first icon in a first size in response to the first energy source transmitting energy to propel the vehicle at or below a first predetermined rate; causing the screen to display the first icon in a second size larger than the first size in response to the first energy source transmitting energy to propel the vehicle above the first predetermined rate; causing the screen to display the second icon in a third size in response to the second energy source transmitting energy to propel the vehicle at or below a second predetermined rate; and causing the screen to display the second icon in a fourth size larger than the third size in response to the second energy source transmitting energy to propel the vehicle above the second predetermined rate.

19. The method of claim 14, wherein changing the appearance of the screen includes causing the screen to display animated visual elements in response to the first energy source transmitting energy to propel the vehicle above a first predetermined rate, or the second energy source transmitting energy to propel the vehicle above a second predetermined rate.

20. A vehicle comprising
a motor/generator, a battery, and a fuel cell; the battery and the fuel cell being configured to selectively transmit energy to the motor/generator to propel the vehicle;
a display apparatus including a screen configured to depict a first icon representing the battery and displaying a first color, a second icon representing the fuel cell displaying a second color different from the first color, and a third icon representing the propulsion of the vehicle;
wherein the display apparatus is sufficiently configured such that a first portion of the third icon displays the first color and the first icon is depicted in a first size in response to the battery transmitting energy to propel the vehicle at a rate higher than a first predetermined rate;

the first portion of the third icon does not display the first color and the first icon is depicted in a second size different from the first size in response to the battery transmitting energy to propel the vehicle at or below the first predetermined rate;

a second portion of the third icon displays the second color and the second icon is a third size in response to the fuel cell transmitting energy to propel the vehicle at a rate higher than a second predetermined rate;

the second portion of the third icon does not display the second color and the second icon is a fourth size different from the third size in response to the fuel cell transmitting energy to propel the vehicle at or below the second predetermined rate; and a third portion of the screen displays the second color in response to the fuel cell source transmitting energy directly to the battery above a third predetermined rate; and wherein the third portion does not display the second color in response to the fuel cell transmitting energy to the battery at or below the third predetermined rate.

* * * * *